United States Patent Office 3,299,148
Patented Jan. 17, 1967

3,299,148
TRIHALOGENATED METHYL MERCAPTANS
Engelbert Kühle, Cologne-Stammheim, and Erich Klauke, Cologne-Flittard, Germany, assignors to Farbenfabriken Bayer Aktiengesellschaft, Leverkusen, Germany, a corporation of Germany
No Drawing. Filed Feb. 6, 1964, Ser. No. 343,109
Claims priority, application Germany, Apr. 27, 1963,
F 39,606
7 Claims. (Cl. 260—609)

The present invention relates to a process for the production of trihalogen methyl mercaptans of the general formula

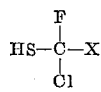

where X is chlorine or fluorine.

The only trihalogenated methylmercaptan hitherto known is triuoromethylmercaptan, which may be obtained according to Soc. 1953, page 3219 as follows:

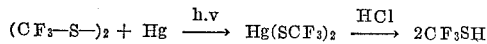

Although the production of trichloromethylmercaptan has already been described, the product obtained would clearly appear to be the bis-trichloromethyldisulphide according to the following equation

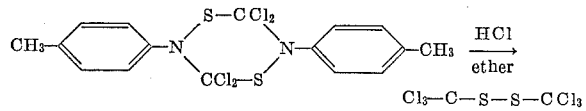

according to the experimental details given in Soc. 1934, pages 822–824.

It has now been found that fluorodichloromethylmercaptan and difluorochloromethylmercaptan can be prepared by splitting thiosulphonates of the following formula at elevated temperature with dry hydrogen chloride:

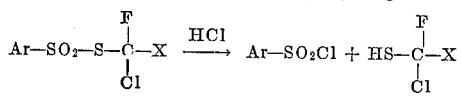

In this equation, X is chlorine or fluorine and Ar is an aromatic radical, preferably a benzene, chlorobenzene or toluene radical. The reaction according to the invention is preferably carried out in substance or in a high boiling inert solvent such as dichlorobenzene, trichlorobenzene or nitrobenzene, dry hydrogen chloride being introduced into the reaction solution at 150 to 250° (200–250°). The mercaptan formed in this reaction is removed from the reaction zone by distillation together with excess hydrogen chloride and can be purified by redistillation. The aromatic sulphochloride obtained may be purified by vacuum distillation and be used again for the same reaction by subsequent conversion into the corresponding sulphinic acid and the corresponding thiosulphonic acid ester.

The new mercaptains are intermediate products for further organic syntheses. Thus, for example, they may be converted with suitable sulphenyl chlorides into disulphides of the formula

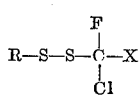

where X is chlorine or fluorine, which have been disclosed in Belgian patent specification 624,304 and which are active as insecticides.

EXAMPLE 1

*Fluorodichloromethylmercaptan*

Dry hydrogen chloride is introduced at 200 to 230° into 94 g. benzene sulphonic acid thiofluorodichloromethyl ester. An orange coloured distillate is thus produced, which distills over with excess hydrogen chloride at about 35 to 45°. 6 g. fluorodichloromethylmercaptan of boiling point 90.5 to 92° are obtained on redistillation.

*Analysis.*—Calculated: C, 8.9; H, 0.74. Found: C, 8.75; H, 0.60.

Difluorochloromethylmercaptan, B.P. 42–43°, is obtained in a similar manner.

We claim:

1. Trihalogen-methylmercaptans of the formula

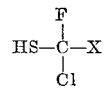

wherein X is a member of the group consisting of chlorine and fluorine.

2. Fluorodichloromethylmercaptan.

3. Difluorochloromethylmercaptan.

4. Process for the production of trihalogenated methylmercaptans, which comprises reacting aromatic thiosulphonates of the formula

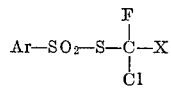

wherein Ar is a phenyl radical and X is a member of the group consisting of chlorine and fluorine, with dry hydrogen chloride at a temperature of 150 to 250° C. and recovering the trihalogenated methylmercaptans formed.

5. Process for the production of trihalogenated methylmercaptans, which comprises reacting aromatic thiosulphonates of the formula

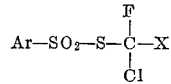

wherein Ar is a member of the group consisting of the phenyl, a chlorophenyl and a toluyl radical and X is a member of the group consisting of chlorine and fluorine, with dry hydrogen chloride at a temperature of 150 to 250° C. and recovering the trihalogenated methylmercaptans formed.

6. Process for the production of fluorodichloromethylmercaptan which comprises reacting benzene sulfonic acid thiofluorodichloromethylester with dry hydrogen chloride at a temperature of 200 to 230° C. and recovering the fluorodichloromethylmercaptan by distillation.

7. Process for the production of difluorochloromethylmercaptan which comprises reacting benzene sulfonic acid thiodifluorochloromethylester with dry hydrogen chloride at a temperature of 200 to 230° C. and recovering the difluorochloromethylmercaptan by distillation.

No references cited.

CHARLES B. PARKER, *Primary Examiner.*

D. R. PHILLIPS, *Assistant Examiner.*